US008982931B2

(12) United States Patent
Gianvittorio et al.

(10) Patent No.: US 8,982,931 B2
(45) Date of Patent: Mar. 17, 2015

(54) RF PUCK

(71) Applicant: Raytheon Company, Waltham, MA (US)

(72) Inventors: John P. Gianvittorio, El Segundo, CA (US); Jason G. Milne, El Segundo, CA (US); Frederick A. Dominski, El Segundo, CA (US)

(73) Assignee: Raytheon Company, Waltham, MA (US)

( * ) Notice: Subject to any disclaimer, the term of this patent is extended or adjusted under 35 U.S.C. 154(b) by 0 days.

(21) Appl. No.: 13/837,149

(22) Filed: Mar. 15, 2013

(65) Prior Publication Data

US 2014/0269856 A1    Sep. 18, 2014

(51) Int. Cl.
| H04B 1/38 | (2006.01) |
| G01S 7/03 | (2006.01) |
| H04B 1/036 | (2006.01) |
| H01Q 1/02 | (2006.01) |
| H01Q 21/00 | (2006.01) |
| H01Q 21/06 | (2006.01) |
| H01Q 23/00 | (2006.01) |

(52) U.S. Cl.
CPC . *H04B 1/38* (2013.01); *G01S 7/032* (2013.01); *H04B 1/036* (2013.01); *H01Q 1/02* (2013.01); *H01Q 21/0025* (2013.01); *H01Q 21/064* (2013.01); *H01Q 21/065* (2013.01); *H01Q 23/00* (2013.01)
USPC ............................ 375/219; 342/372; 367/138

(58) Field of Classification Search
None
See application file for complete search history.

(56) References Cited

U.S. PATENT DOCUMENTS

| 5,461,389 | A | 10/1995 | Dean | |
| 6,882,311 | B2 | 4/2005 | Walker et al. | |
| 7,123,882 | B1 | 10/2006 | Frazier | |
| 7,492,313 | B1 | 2/2009 | Ehret et al. | |
| 8,604,529 | B2 * | 12/2013 | Cha | 257/292 |
| 2005/0285773 | A1 | 12/2005 | Hartzstein et al. | |
| 2009/0015672 | A1* | 1/2009 | Clapp | 348/143 |
| 2011/0148707 | A1* | 6/2011 | Thiesen et al. | 342/372 |
| 2012/0063098 | A1 | 3/2012 | Paquette et al. | |
| 2012/0154203 | A1 | 6/2012 | Vacanti et al. | |

(Continued)

FOREIGN PATENT DOCUMENTS

EP    0617796 B1    2/2000

OTHER PUBLICATIONS

"PCB of iPhone 3G", retrieved from the Internet: URL:http://forum.gsmhosting.com/vbb/f631/iphone-ipad-components-schematics-diagrams-etc-898915/ retrieved Apr. 8, 2014, (2 pgs.).

(Continued)

*Primary Examiner* — Adolf Dsouza
(74) *Attorney, Agent, or Firm* — Christie, Parker & Hale, LLP

(57) ABSTRACT

An RF module including transmitting, receiving, and processing elements, capable of operating in a standalone mode or as part of an array of similar or identical modules. The RF module includes a radiator (205), transmit-receive circuitry (165), a digital receiver-exciter (160), a processor (100), and a data interface (150). The processor is configured to exchange in-phase and quadrature data with other processors in an array, so that, when configured as an array, digital transmit beam forming and receive beam forming are possible.

20 Claims, 5 Drawing Sheets

(56) References Cited

U.S. PATENT DOCUMENTS

2013/0009807 A1* 1/2013 Lamb .................. 342/25 B
2013/0250971 A1* 9/2013 Mora et al. ................ 370/467

OTHER PUBLICATIONS

Chappell, et al., "Digital Array Radar Panel Development", Phased Array System and Technology (Array), 2010 IEEE International Symposium, IEEE, Piscataway, NJ, USA, Oct. 12, 2010 (pp. 50-60).
Datasheet "MAX2828/MAX2829 Single-/Dual-Band 802.1 la/b/g World-BandTransceiver ICs", retrieved from the Internet: URL:http://datasheets.maximintegrated.com/en/ds/MAX2828-MAX2829.pdf, Aug. 15, 2005 (39 pgs.)
Szustak, et al., High Power S Band T/R Module, Microwave Radar And Wireless Communications (MIKON), 2010 18th International Conference On, IEEE, Piscataway, NJ, USA Jun. 14, 2010 (4 pgs.).
Written Opinion of the International Searching Authority for International Application No. PCT/US2014/013656, filed Jan. 29, 2014, Written Opinion of the International Searching Authority mailed Apr. 15, 2014 (9 pgs.).
International Search Report for International Application No. PCT/US2014/013656, filed Jan. 29, 2014, International Search Report dated Apr. 8, 2014 and mailed Apr. 15, 2014 (4 pgs.).

* cited by examiner

RF PUCK

BACKGROUND

1. Field

One or more aspects of embodiments according to the present invention relate to components of radio frequency systems with array antennas, and more particularly to a modular system for forming readily expandable array antenna systems.

2. Description of Related Art

Conventional active electronically scanned array (AESA) radar systems include arrays of antenna elements connected to a splitter-combiner network, which contains phase and amplitude control elements used for beam forming and beam steering. The splitter-combiner network may for example be configured as a corporate feed. The common input of the splitter-combiner network may be driven by a power amplifier, and the common output of the splitter-combiner network may be fed to a low-noise amplifier, for transmitted signals and received signals, respectively. The splitter and combiner networks may share certain components, such as phase control elements, which may be capable of use for both transmitted and received signals.

A structure of this sort is affected by what is known as the "N+1" problem, viz., the making of a small change in the requirements, such as increasing the number of antenna elements by one, necessitates a disproportionately large change in the design, such as the replacement of the splitter-combiner network. Thus, there is a need for an antenna array design which can be readily reconfigured to a larger or smaller number of elements or subarrays. Moreover, it is desirable that such a design be modular, allowing large or small collections of similar or identical elements to be assembled as needed, to form a large or small array.

SUMMARY

In one embodiment, an RF module includes transmitting, receiving, and processing elements, capable of operating in a standalone mode or as part of an array of similar or identical modules. The RF module includes a radiator, transmit-receive circuitry, a digital receiver-exciter, a processor, and a data interface. The processor is configured to exchange in-phase and quadrature data with other processors in an array of similar or identical modules, so that, when configured as an array, digital transmit beam forming and receive beam forming are possible.

According to an embodiment of the present invention there is provided a radio-frequency (RF) module for use in an integrated system with at least one other RF module, the RF module including: an aperture including an antenna element for transmitting or receiving electromagnetic radiation; a transmit-receive circuit coupled to the antenna element; a heat exchanger thermally coupled to the transmit-receive circuit; a synchronization interface for transmitting or receiving a synchronization signal; a digital receiver-exciter coupled to the transmit-receive circuit, and coupled to the synchronization interface, the digital receiver-exciter configured to obtain digital samples of a received signal, the received signal corresponding to electromagnetic radiation received by the antenna element; a processor coupled to the digital receiver-exciter; and a data interface coupled to the processor; wherein the processor is configured: to form, from the digital samples of the received signal, in-phase and quadrature data representing the received signal; and to output the in-phase and quadrature data through the digital interface.

In one embodiment, the transmit-receive circuit includes a low-noise amplifier and a power amplifier.

In one embodiment, the heat exchanger includes cooling channels configured to accommodate a cooling fluid.

In one embodiment, the heat exchanger includes fluid couplings configured to connect the RF module to, and to receive cooling fluid from, another RF module.

In one embodiment, the digital receiver-exciter includes a local oscillator.

In one embodiment, the local oscillator is configured to be phase-locked to the synchronization signal.

In one embodiment, the local oscillator is configured to be phase-locked to a 10 MHz tone.

In one embodiment, the digital receiver-exciter includes an analog to digital converter configured to be operated with a sampling rate at least four times an intermediate frequency (IF).

In one embodiment, the digital receiver-exciter includes two analog to digital converters each configured to be operated with a sampling rate at least twice an intermediate frequency (IF).

In one embodiment, the digital receiver-exciter includes components fabricated using a silicon-germanium (SiGe) process.

In one embodiment, the digital receiver-exciter includes components fabricated using a three dimensional silicon-germanium (3D SiGe) process.

In one embodiment, the data interface comprises an Ethernet interface.

In one embodiment, the data interface comprises a wireless interface.

In one embodiment, the processor is configured to output image data to an end user client device.

In one embodiment, the processor is configured to output image data to a mobile telephone including a graphical display.

In one embodiment, the processor is configured to combine samples received from the digital receiver-exciter with in-phase and quadrature data received from other RF modules to form intermediate radar data products.

In one embodiment, the processor is configured to form intermediate radar data products including Doppler filtered data.

In one embodiment, the processor is configured to form intermediate radar data products comprising range-compressed data.

In one embodiment, the processor includes a field programmable gate array (FPGA).

In one embodiment, the processor includes an application specific integrated circuit (ASIC).

BRIEF DESCRIPTION OF THE DRAWINGS

Features, aspects, and embodiments are described in conjunction with the attached drawings, in which.

DETAILED DESCRIPTION

The detailed description set forth below in connection with the appended drawings is intended as a description of exemplary embodiments of an RF module provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

Figure 1:
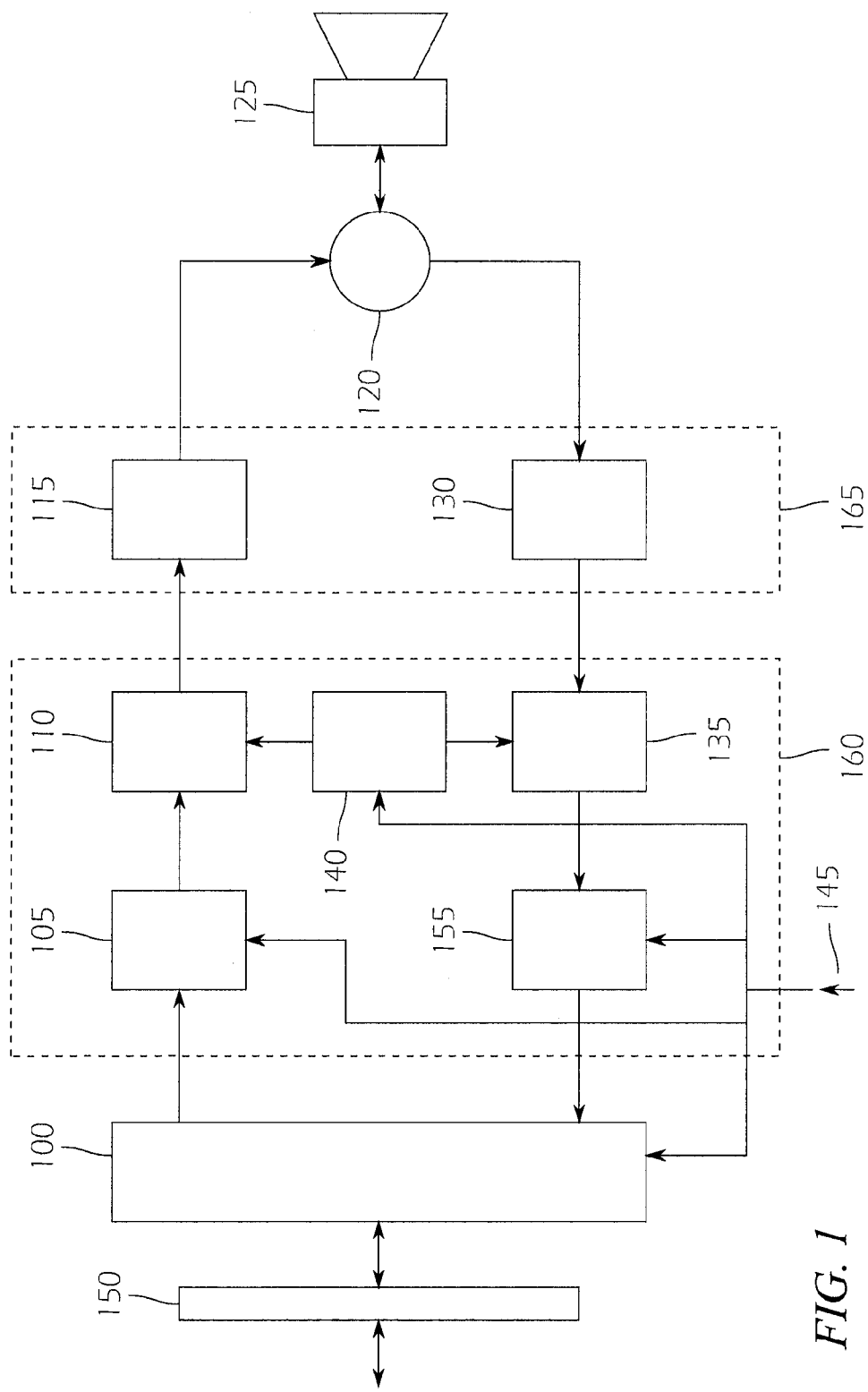
FIG. 1 is a schematic block diagram of an RF module according to an embodiment of the present invention.

Referring to FIG. 1, in one embodiment a radio frequency (RF) module with a single antenna element 125 includes elements for handling both transmitted and received radar signals. When transmitting, the digital to analog converter 105 generates an intermediate frequency (IF) signal under the control of the processor 100. The IF signal is upconverted by the upconverter 110 to RF, amplified by a power amplifier 115, coupled to the antenna element 125 by a circulator 120, and transmitted as free-space electromagnetic radiation. The term "RF" is used herein, for brevity, to include radio frequencies, microwave frequencies, and millimeter wave frequencies, i.e., to include a frequency range spanning from approximately 100 megahertz (MHz) to 100 gigahertz (GHz).

When the RF module is receiving, free-space electromagnetic radiation is converted by the antenna element 125 into waves traveling in a waveguide, which may be a strip-line or microstrip transmission line, and coupled to a low-noise amplifier 130 by the circulator 120. The signal from the low-noise amplifier 130 is downconverted to IF, and converted to digital form by an analog to digital converter 155, and the digital representation of the IF signal is sent to the processor 100. An RF module with multiple antenna elements 125 may have a circulator 120 for each of the antenna elements 125, and a splitter-combiner network connecting the multiple antenna elements 125 to a common input and a common output. The common input and common output may be connected to the output of the power amplifier 115 and to the input of the low-noise amplifier 130, respectively. One or more transmit-receive (T/R) switches may be included in the RF module to protect the low-noise amplifier 130 from high power signals which, during transmission, may be reflected from the antenna element 125 or leak through the circulator 120, or to allow certain RF elements, such as phase control elements, to be used both when the RF module is transmitting and when it is receiving.

Conceptually, the power amplifier 115 and low-noise amplifier 130 may be grouped into a functional block which may be referred to as a transmit-receive circuit 165, and the upconverter 110, downconverter 135, local oscillator 140, analog to digital converter 155, and digital to analog converter 105 may be grouped into a functional block which may be referred to as a digital receiver-exciter 160. Because of the interconnectedness of these elements, it may be advantageous to place the components of the digital receiver-exciter 160 near each other in the RF module, and it may be advantageous to place the components of the transmit-receive circuit 165 near the components of the digital receiver-exciter 160. In one embodiment, the transmit-receive circuit 165 is coupled to the antenna element 125 by a circulator 120; in other embodiments the transmit-receive circuit 165 is coupled to the antenna element 125 by a hybrid coupler, or by a T/R switch.

A single RF module may be operated as a standalone system, for example as a low-mass, low-resolution radar unit on a small unmanned aerial vehicle (UAV) on which mass may be critical, or several RF modules may be operated together, as an integrated system, with improved performance. In such a case, it may be helpful to synchronize the RF modules, at the analog to digital converter and digital to analog converter level, so that conversion between analog IF and digital data are performed in a synchronized manner in the RF modules in the integrated system. It may also be helpful to synchronize the RF modules at the upconversion and downconversion level, so that phase coherence may be maintained between the RF modules in the integrated system. This synchronization may be achieved using a master synchronization signal 145, which may, for example, be a 10 MHz tone. One RF module may be configured to generate and transmit the synchronization signal 145 and the remaining RF modules in the integrated system may be configured, like the RF module illustrated in FIG. 1, to receive the synchronization signal 145.

In one embodiment the configuration is set at the time of manufacture. In another embodiment, the RF modules may all be manufactured to be identical, and whether a particular RF module acts as a source or recipient may be determined by a hardware or software switch setting. In one embodiment each RF module has a synchronization output and a synchronization input for a synchronization signal, and each RF module is configured to use the synchronization signal at the synchronization input, if a signal is present there. In this embodiment whether a particular RF module acts as a source or recipient of the synchronization signal 145 may be determined or by the manner in which the synchronization signal connection is made to the RF module, i.e., whether the connection is made to the synchronization input or to the synchronization output. In each RF module, a local oscillator 140 operating at RF may be phase locked to the synchronization signal 145, and this local oscillator 140 may be used for both upconversion and downconversion. Similarly, the analog to digital converter 155 and digital to analog converter 105 may be triggered or clocked by a clock phase-locked to the synchronization signal 145.

The processor 100 may provide a range of functions, enabling a collection of RF modules to operate as an integrated system. The term "processor" is used herein to include any combination of hardware, firmware, and software, employed to process data or digital signals. Processor hardware may include, for example, application specific integrated circuits (ASICs), general purpose or special purpose central processing units (CPUs), digital signal processors (DSPs), graphics processing units (GPUs), and programmable logic devices such as field programmable gate arrays (FPGAs).

For example, the processors 100 may be configured to operate as a distributed computing system, in which each processor 100 performs a share of the computational burden of the integrated system and also performs certain processing and control tasks specific to the RF module on which it resides. Each processor 100 may, for example, control the digital to analog converter 105 to generate a waveform, such as a linear chirp, and the relative amplitude and phase of the waveform transmitted by each RF module may be selected to produce a beam of a desired shape and transmitted in a desired direction. The shape and direction of the beam may vary with time, under the control of the processors 100.

The received signal may be represented as a sum of in-phase and quadrature components with respect to the phase of the local oscillator 140. These in-phase and quadrature components may be measured in the IF signal if the analog to digital converter sampling rate is at least four times the IF frequency. In one embodiment, two analog to digital converters 155 may be employed to sample the IF signal alternately and thereby to improve the total, or effective, sampling rate. The raw samples obtained from the analog to digital converters 155 may be processed by the processor 100 to represent the received signal as a pair of numbers, or as a single complex number, corresponding to the in-phase and quadrature components for each sample of the IF signal.

The in-phase and quadrature components representing the received signal in several RF modules may be combined by the processors 100 to accomplish digital beam-forming of the received beam. Moreover, multiple receive beams may be operated simultaneously by simultaneously forming multiple different combinations of the received signals from the several RF modules. To perform digital beam-forming of the received beam, it may be helpful for the processor 100 of one RF module to receive the in-phase and quadrature data from other RF modules.

The processors 100 in the integrated system may be interconnected by a data interface 150, allowing the processors 100 to exchange raw in-phase and quadrature data, viz. allowing each processor 100 to output, through the data interface 150, in-phase and quadrature data, and to receive, through the data interface 150, in-phase and quadrature data from other processors 100. Depending on the bandwidth of the data interface 150, it may be advantageous to exchange reduced-rate filtered in-phase and quadrature instead of full-rate raw in-phase and quadrature data. A processor 100 may also output, through the data interface 150, other intermediate data products derived from the in-phase and quadrature data, such as Doppler filtered data or range-compressed data. These intermediate data products, or other data products, may be delivered over the data interface 150 to a client device. In one embodiment, a processor 100 in one of the RF modules may deliver data in image form, showing locations of targets, to a client device having a user display, and the client device may display the image to a user. In one embodiment the client device is a smart phone, i.e., a mobile telephone with a graphical display. The data interface 150 may be a purpose-designed wired or wireless data interface 150, or it may be based on a commercially available standard interface, such as Ethernet, or a wireless interface such as WI-FI™.

The integrated system may have additional provisions for sharing resources between the RF modules. The RF modules may share a source of electrical power, for example, and they may share aspects of a cooling system. Cooling may be needed for the power amplifier 115, and it may be provided by a heat exchanger 210 (FIG. 2), cooled by liquid coolant, or by a phase-change closed loop configuration, and installed in the RF module so that heat may be conducted from the power amplifier 115 to the heat exchanger 210. The heat exchangers 210 in the RF modules in the integrated system may be daisy-chained, i.e., the heat exchangers may be fitted with fluid connectors so that the coolant inlet of one RF module may be connected to the coolant outlet of another RF module, either directly or with a tube or hose, so that, in the integrated system, coolant from a single source of coolant may flow through each heat exchanger 210.

It may be advantageous to construct the processor 100 of a combination of different components including one or more microprocessors, FPGAs and ASICs. As will be apparent to one of skill in the art, a microprocessor may have broader capabilities to perform, e.g., complex calculations but it may lack the speed of an FPGA or an ASIC, which may be necessary for certain tasks, such as generating an IF drive waveform to control the digital to analog converter 105.

Figure 2A:
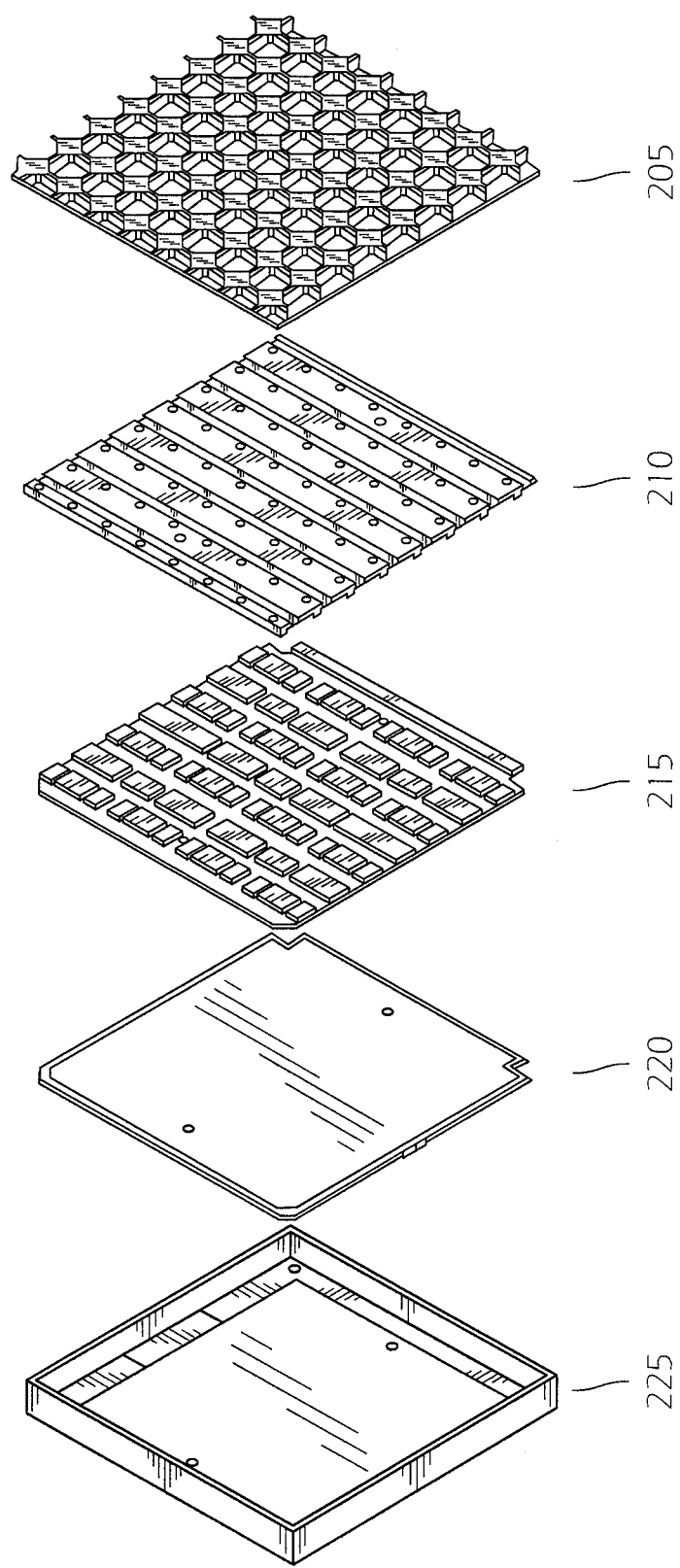
FIG. 2A is an exploded perspective view of an RF module according to an embodiment of the present invention.
Figure 2B:
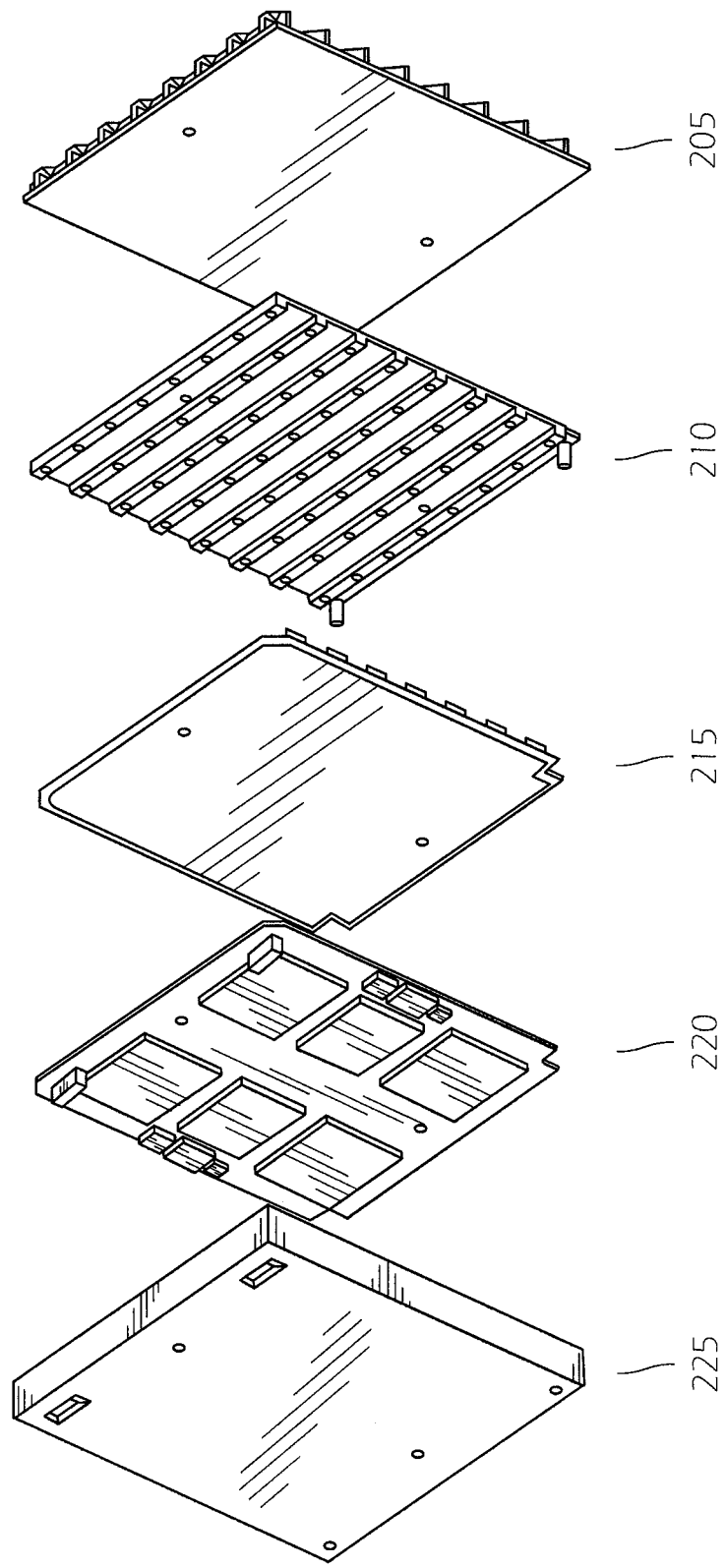
FIG. 2B is another exploded perspective view of an RF module according to an embodiment of the present invention.

Referring to FIGS. 2A and 2B, in one embodiment an RF module is formed from five principal subassemblies: a radiator 205, including one or more antenna elements 125, a heat exchanger 210, an RF board 215, a digital board 220, and a housing 225. The heat exchanger 210 contains cooling channels through which coolant may be made to flow, and it is installed against the RF board 215 so as to conduct away heat generated by components such as power amplifiers 115 on the RF board 215. The RF board 215 contains a digital to analog converter 105, an upconverter 110, and a power amplifier 115 for the transmitted signal, and a low-noise amplifier 130, downconverter 135, and analog to digital converter 155 for the received signal. Components on RF board 215 may be in miniature digital receiver exciter (MDREX) modules, fabricated in a silicon-germanium (SiGe) process, or in a three-dimensional silicon-germanium (3D SiGe) process. The interface between the RF board 215 and the digital board 220 is entirely digital.

The digital board 220 contains processing circuitry, which may include a combination of one or more microprocessors 100, FPGAs, and ASICs. The digital board 220 may also contain one or more accelerometers and a Global Positioning System (GPS) receiver; these may be integrated with an estimator to provide navigation solutions. The navigation solutions may be used, for example, to keep the radar transmit and receive beams illuminating an area of interest on the ground if the radar is installed on a maneuvering aircraft, or to register radar observations to reference locations or coordinates on the ground. The digital board 220 also contains circuitry, such as a WI-FI™ transceiver, to provide the data interface 150.

Figure 3A:
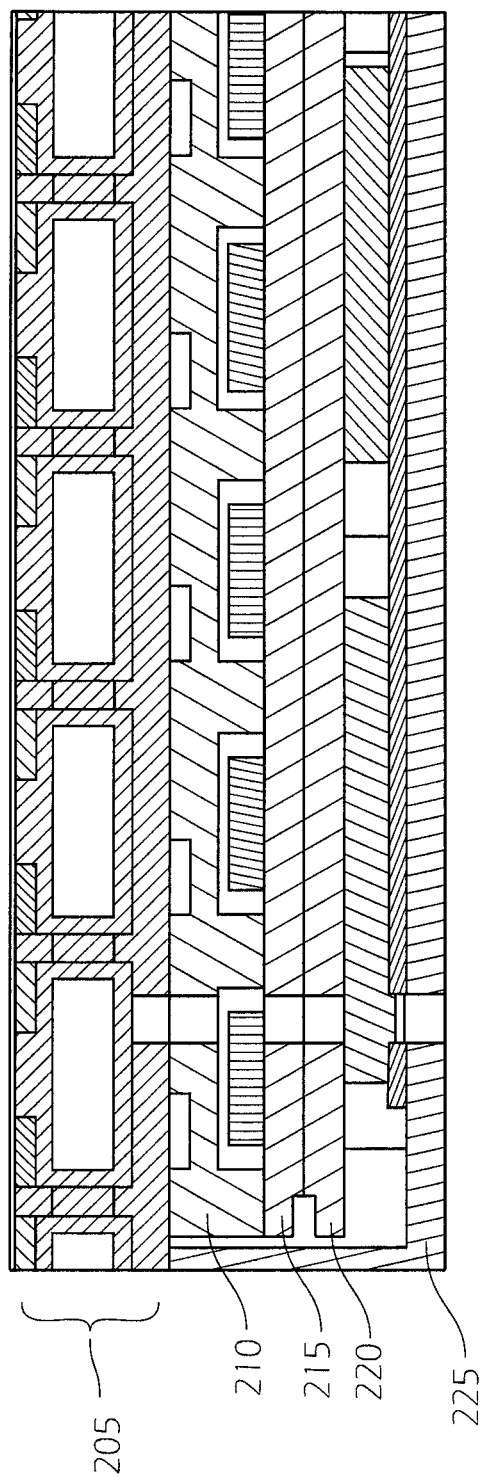
FIG. 3A is cross-sectional view of a portion of an RF module according to an embodiment of the present invention.
Figure 3B:
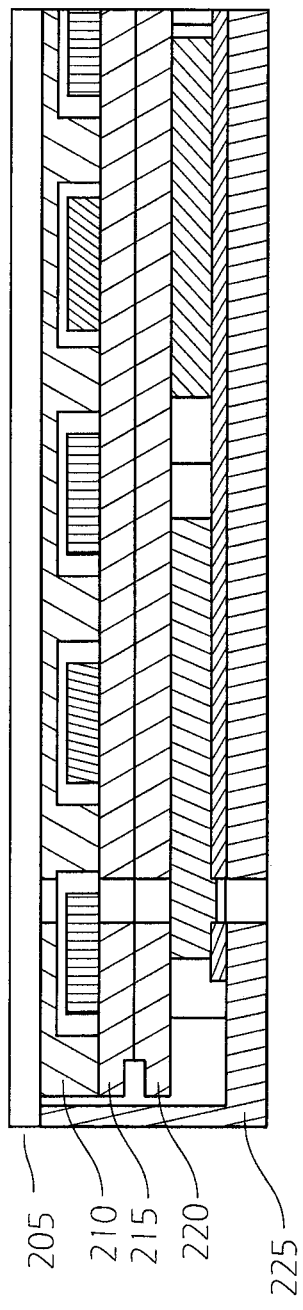
FIG. 3B is cross-sectional view of a portion of an RF module according to another embodiment of the present invention.

Referring to FIG. 3A, in one embodiment, the subassemblies are stacked to form a compact assembly including an array of antenna elements 125 in the form of slot radiators 205, a heat exchanger 210 providing cooling, an RF board 215, a digital board 220, and a housing 225. Referring to FIG. 3B, in another embodiment the thickness of the assembly may be reduced by using antenna elements 125 in the form of patch radiators 205, and using bare die components on the RF board 215 or on the digital board 220.

Figure 3C:
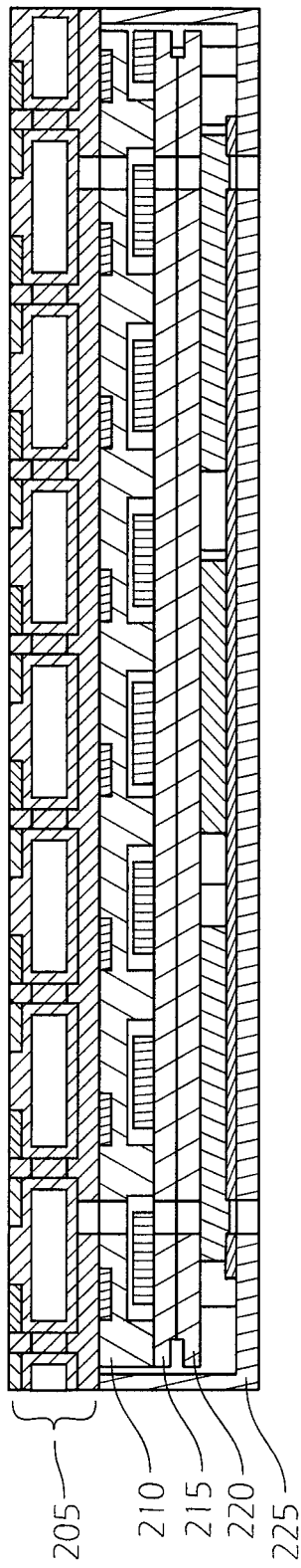
FIG. 3C is cross-sectional view of an RF module according to the embodiment of FIG. 3A.

In one embodiment, the size of an RF module is approximately three inches by three inches. The number of antenna elements 125 may depend on frequency. One antenna element 125 may be used, for example, for operation at S-Band. At higher frequencies than S-band, the number of antenna elements 125 may be greater, varying in proportion to the square of the RF frequency. Referring to FIG. 3C, an RF module operating at approximately 18 GHz, for example, may have a square array of antenna elements with eight antenna elements 125 on a side, for a total of 64 elements in a square RF module.

Although limited embodiments of an RF module have been specifically described and illustrated herein, many modifications and variations will be apparent to those skilled in the art. For example, although the examples presented herein are discussed primarily in the context of radar systems, embodiments of the present invention may equally well be used in other applications, such as for wireless communications or electronic warfare. As another example, an integrated system of RF modules may be operated without a synchronization signal, in an array of widely separated modules, for example. As another example, the transmit-receive circuit may in one embodiment be part of a three-dimensional (3D) package also including the receiver portion of the receiver-exciter 160 and elements of the processor 100 such as an ASIC. Accordingly, it is to be understood that the RF module employed according to principles of this invention may be embodied other than as specifically described herein. The invention is also defined in the following claims, and equivalents thereof.

What is claimed is:

1. A radio-frequency (RF) module for use individually or in an integrated system with at least one other RF module, the RF module comprising:
an aperture comprising an antenna element for transmitting or receiving electromagnetic radiation;
a transmit-receive circuit coupled to the antenna element;
a heat exchanger thermally coupled to the transmit-receive circuit;
a synchronization interface for transmitting or receiving a synchronization signal;
a digital receiver-exciter coupled to the transmit-receive circuit, and coupled to the synchronization interface, the digital receiver-exciter configured to obtain digital samples of a received signal, the received signal corresponding to electromagnetic radiation received by the antenna element;
a processor coupled to the digital receiver-exciter; and
a data interface coupled to the processor;
wherein the processor is configured:
to form, from the digital samples of the received signal, in-phase and quadrature data representing the received signal; and
to output the in-phase and quadrature data through the data interface,
wherein the module is configured to operate in an integrated system with a second module, the second module being identical to the module except for a switch setting, the module being configured
to receive in-phase and quadrature data, through the data interface, from the second module, and
to combine:
the in-phase and quadrature data formed from the digital samples of the received signal, and
the in-phase and quadrature data received from the second module, to perform digital beam-forming.

2. The RF module of claim 1, wherein the transmit-receive circuit comprises a low-noise amplifier and a power amplifier.

3. The RF module of claim 1, wherein the heat exchanger comprises cooling channels configured to accommodate a cooling fluid.

4. The RF module of claim 3, wherein the heat exchanger comprises fluid connectors configured to connect the RF module to, and to receive cooling fluid from, another RF module.

5. The RF module of claim 1, wherein the digital receiver-exciter comprises a local oscillator.

6. The RF module of claim 5, wherein the local oscillator is configured to be phase-locked to the synchronization signal.

7. The RF module of claim 6, wherein the local oscillator is configured to be phase-locked to a 10 MHz tone.

8. The RF module of claim 1, wherein the digital receiver-exciter comprises an analog to digital converter.

9. The RF module of claim 1, wherein the digital receiver-exciter comprises two analog to digital converters.

10. The RF module of claim 1, wherein the digital receiver-exciter comprises components fabricated using a silicon-germanium (SiGe) process.

11. The RF module of claim 10, wherein the digital receiver-exciter comprises components fabricated using a three dimensional silicon-germanium (3D SiGe) process.

12. The RF module of claim 1, wherein the data interface comprises an Ethernet interface.

13. The RF module of claim 1, wherein the data interface comprises a wireless interface.

14. The RF module of claim 13, wherein the processor is configured to output image data to an end user client device.

15. The RF module of claim 14, wherein the processor is configured to output image data to a mobile telephone comprising a graphical display.

16. The RF module of claim 1, wherein the processor is configured to combine samples received from the digital receiver-exciter with in-phase and quadrature data received from other RF modules to form intermediate radar data products.

17. The RF module of claim 16, wherein the processor is configured to form intermediate radar data products comprising Doppler filtered data.

18. The RF module of claim 16, wherein the processor is configured to form intermediate radar data products comprising range-compressed data.

19. The RF module of claim 1, wherein the processor comprises a field programmable gate array (FPGA).

20. The RF module of claim 1, wherein the processor comprises an application specific integrated circuit (ASIC).

* * * * *